(12) United States Patent
Naamneh et al.

(10) Patent No.: US 10,489,592 B1
(45) Date of Patent: Nov. 26, 2019

(54) CREATING AN EXECUTION SAFETY CONTAINER FOR UNRELIABLE EXPLOITS

(71) Applicant: Symantec Corporation, Mountain View, CA (US)

(72) Inventors: Bahaa Naamneh, Oslo (NO); Felix Leder, Tårnåsen (NO)

(73) Assignee: Symantec Corporation, Mountain View, CA (US)

( * ) Notice: Subject to any disclaimer, the term of this patent is extended or adjusted under 35 U.S.C. 154(b) by 294 days.

(21) Appl. No.: 15/465,157

(22) Filed: Mar. 21, 2017

(51) Int. Cl.
*G06F 21/56* (2013.01)
*G06F 12/14* (2006.01)

(52) U.S. Cl.
CPC ........ *G06F 21/566* (2013.01); *G06F 12/1441* (2013.01); *G06F 2212/1052* (2013.01); *G06F 2221/033* (2013.01)

(58) Field of Classification Search
CPC .................................................. G06F 21/566
USPC ........................................................ 726/23
See application file for complete search history.

(56) References Cited

U.S. PATENT DOCUMENTS

| | | | | |
|---|---|---|---|---|
| 9,495,541 B2* | 11/2016 | Polychronakis | ...... | G06F 21/562 |
| 9,904,792 B1* | 2/2018 | Badishi | .................... | G06F 21/62 |
| 2013/0024930 A1* | 1/2013 | Steil | ...................... | G06F 21/575 |
| | | | | 726/16 |
| 2014/0372701 A1* | 12/2014 | Komaromy | ............. | G06F 21/52 |
| | | | | 711/122 |
| 2015/0020198 A1* | 1/2015 | Mirski | .................. | G06F 21/566 |
| | | | | 726/23 |
| 2016/0092702 A1* | 3/2016 | Durham | .................. | G06F 21/72 |
| | | | | 713/190 |
| 2016/0170769 A1* | 6/2016 | LeMay | ................. | G06F 9/3863 |
| | | | | 713/190 |
| 2016/0196425 A1* | 7/2016 | Davidov | ............... | G06F 21/566 |
| | | | | 726/23 |
| 2017/0116418 A1* | 4/2017 | Shanmugavelayutham | ................ | |
| | | | | G06F 21/566 |
| 2017/0147819 A1* | 5/2017 | Vasilenko | ............. | G06F 21/566 |
| 2018/0039776 A1* | 2/2018 | Loman | ..................... | G06F 21/54 |
| 2018/0060244 A1* | 3/2018 | Godard | ............... | G06F 12/0875 |

OTHER PUBLICATIONS

Bhatkar et al. "Address Obfuscation: an Efficient Approach to Combat a Broad Range of Memory Error Exploits" Aug. 4-8, 2003; Proceedings of the 12th USENIX Security Symposium pp. 105-120 (Year: 2003).*

* cited by examiner

*Primary Examiner* — Khalil Naghdali
(74) *Attorney, Agent, or Firm* — Patterson & Sheridan, LLP

(57) ABSTRACT

The present disclosure relates to executing software within an execution safety container. An example method generally includes detecting that a memory address referenced by a stack pointer has changed from a first memory address to a second memory address. An execution safety container compares the referenced memory address to a memory address range associated with an application, and upon determining that the referenced memory address is not within the memory address range associated with the application, takes one or more actions to avoid occurrences of unhandled exceptions caused by the referenced memory address being outside of a memory address range associated with an application.

20 Claims, 5 Drawing Sheets

CREATING AN EXECUTION SAFETY CONTAINER FOR UNRELIABLE EXPLOITS

BACKGROUND

Field

Embodiments presented herein generally relate to malware analysis/exploit code analysis systems, and more specifically, to creating execution safety containers to allow for the execution and observation of malware and exploit code behavior.

Description of the Related Art

Malicious software components, or malware, generally encompass various types of programs that perform unwanted actions on a computer. These software components may include viruses, worms, Trojan horses, rootkits, keyloggers, and the like. In some cases, malware components can destroy data on a computer, exfiltrate sensitive data from a computer (e.g., logging and transmitting username and password information to a remote computer), or take over a computer, causing the computer to perform actions that the computer would otherwise not do (e.g., act as a member of a botnet under the control of a malicious command-and-control server, send spam e-mail, or otherwise propagate malware to other computers).

Programs may, in some cases, be vulnerable to various kinds of exploits. These exploits may allow for the injection and execution of malicious code into a program, privilege escalation that allows the program to perform actions that may normally be restricted to system administrators, leak data, and the like. Some of these exploits may allow unauthorized users to access data on a computer system and exfiltrate that data.

To build defenses against malware or other code that exploits vulnerabilities in existing software, malware analysis tools can be used to examine exploit code and observe exploits during execution. Some malware analysis tools may expose the compiled code of a malware component or other exploit code for static analysis (e.g., analysis of a malware component before the malware component executes). For example, malware components deployed as executable files (e.g., Portable Executable files in Windows, executable Java archives (JARs), and the like) can be decompiled and statically analyzed to identify how a malware component is written and is intended to execute.

In other cases, malware analysis tools can be used to perform a runtime analysis of malware components or other exploit code. Generally, a runtime analysis entails executing a malware component or other exploit code (e.g., in an isolated environment, such as a sandbox or a virtual machine, to prevent the malware component from causing harm to the system on which the component is executed) and monitoring the behavior of the malware component during execution. In some cases, however, malware components may not reliably execute in its entirety. Because malware components may not reliably be fully executed, system administrators and malware researchers may not be able to identify the functionality of a malware component during runtime (e.g., how the malware component interacts with other software components installed on a computer, what network traffic the malware component generates during runtime, what files the malware component accesses and/or modifies, and so on).

SUMMARY

One embodiment of the present disclosure includes a method for executing code within an execution safety container. The method generally includes detecting that a memory address referenced by a stack pointer has changed from a first memory address to a second memory address. An execution safety container, in response to the detection, takes one or more actions to avoid occurrences of unhandled exceptions caused by the referenced memory address being outside of a memory address range associated with an application.

Another embodiment provides a computer-readable storage medium having instructions, which, when executed on a processor, performs an operation for executing code with an execution safety container. The operation generally includes detecting that a memory address referenced by a stack pointer has changed from a first memory address to a second memory address. An execution safety container, in response to the detection, takes one or more actions to avoid occurrences of unhandled exceptions caused by the referenced memory address being outside of a memory address range associated with an application.

Still another embodiment of the present invention includes a processor and a memory storing a program, which, when executed on the processor, performs an operation for executing code within an execution safety container. The operation generally includes detecting that a memory address referenced by a stack pointer has changed from a first memory address to a second memory address; and in response to the detection, taking one or more actions to avoid occurrences of unhandled exceptions caused by the referenced memory address being outside of a memory address range associated with an application.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Malware components may, in some cases, be written using a technique known as "stack pivoting." In such a case, the malware component creates a fake stack or otherwise moves the stack pointer to another location in memory. When an error occurs, error handling components in an operation system on which the program executes may examine the current stack pointer and the minimum and maximum memory addresses defined for processing the malware component (or other device on which the malware component resides).

Error handling procedures defined by an operating system on which the malware component is executing generally includes checking the current stack pointer to the memory address boundaries defined for the currently executing application or currently executing thread. If the malware component has changed the current stack pointer, but the current stack pointer is still within the memory address boundaries defined for the currently executing application, error handling procedures may be completed as if the stack pointer had not changed. Otherwise, an error handler may throw an unhandled exception, which may result in the termination of a process in which the malware component is executing (and, correspondingly, termination of the malware component), which may prevent a user from viewing the runtime behavior of a related malware component or related exploit code.

Aspects of the present disclosure describe the creation and usage of an execution safety container in which malware components are monitored. As discussed herein, a malware analysis system can establish an execution safety container for a malware component or exploit code under analysis. As the malware component or exploit code changes the current stack pointer (i.e., changes the memory address to which the stack pointer points), the malware analysis system can determine whether the modified stack pointer remains within the memory address boundaries defined for an application. If the modified stack pointer remains within the memory address boundaries defined for an application, no further action need be taken to ensure that the malware component can execute. Otherwise, the malware analysis system can adjust the memory address boundaries to encompass the new memory address.

Figure 1:
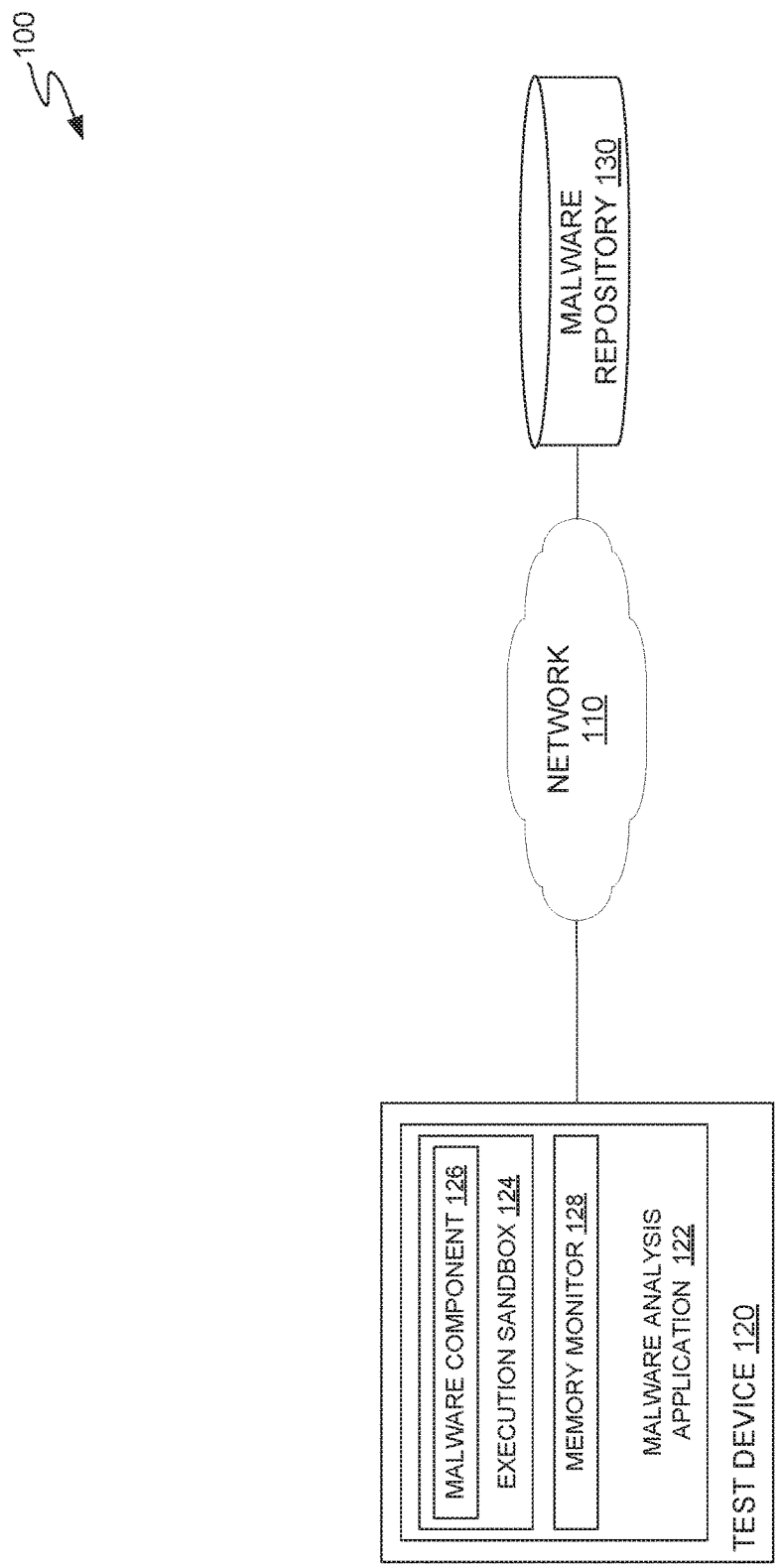
FIG. 1 illustrates an example of a networked computing environment, according to one embodiment.

FIG. 1 illustrates an example networked computing system, according to an embodiment. As illustrated, computing system 100 includes a test device 120 and a malware repository 130, connected via network 110.

Test device 120 may be a physical computer or virtual computing instance on which malware components may be tested and observed. As illustrated, test device 120 hosts a malware analysis application 122. Malware analysis application 122 generally provides an execution sandbox 124 in which a malware component executes and a memory monitor 128 that monitors the current stack pointer and determines whether a modification to the memory address boundaries for the currently executing application may be warranted.

A user may download a malware component 126 from malware repository 130 onto test device 120 for analysis. When the user executes malware component 126, the execution may occur within execution sandbox 124. Execution sandbox 124 may be structured to isolate malware component 126 from other applications executing on test device 120 and/or system components (e.g., shared libraries, network drivers, and the like) installed on test device 120 (e.g., to prevent execution of the malware component 126 from affecting other devices on a network, to prevent malware component 126 from turning test device 120 into another bot in a network of devices controlled by a command-and-control server, and so on).

During execution of malware component 126 within execution sandbox 124, malware component 126 may trigger exceptions to be handled by error handling components of the operating system installed on test device 120. For example, an exception may be raised when a malware component 126 attempts to transmit a request to a remote server but a domain name server (DNS) client service is disabled. In such a case, the error handling code for transmitting the request to a remote server generally includes resolving the host name of the remote server. However, if the current stack pointer, due to the use of stack pivoting techniques, is not within the memory address boundaries defined for the application being compromised by the malware component 126, an unhandled exception may occur. The memory address boundaries defined for the application may be defined by the operating system of test device 120 and may define a minimum memory address (a stack base address) and a maximum memory address (a stack limit address). When an unhandled exception occurs, the operating system may terminate execution of the application, which may also entail terminating execution of the malware component 126.

To allow malware component 126 to continue executing within execution sandbox 124, memory monitor 128 may monitor the current stack pointer and adjust the memory address boundaries for the currently executing application based on the memory address referred to by the current stack pointer. In some cases, memory monitor 128 may periodically determine whether to adjust the memory address boundaries during execution of malware component 126. In other cases, memory monitor 128 may determine whether to adjust the memory address boundaries after detecting that an exception has been triggered during execution of malware component 126 and before the operating system performs a memory address boundary check as part of the error handling process, as discussed above.

Memory monitor 128 is generally configured to adjust the memory address boundaries of the currently executing application to include the memory address referred to by the stack pointer. In some cases, memory monitor 128 can adjust the stack base address and stack limit address by a pre-set amount until the memory address referenced by the stack pointer is within the memory address boundaries of the currently executing application. In some cases, memory monitor 128 can adjust the memory address boundaries of the currently executing application based on the position of the stack pointer relative to one of the stack base address and stack limit address. For processor architectures where a stack grows towards lower memory addresses, memory address boundaries may be adjusted when the stack pointer references a memory address that is greater than the stack base address or less than the stack limit address. Where the stack pointer references a memory address that is greater than the stack base address (e.g., the stack pointer points to a location in memory with a higher address than the stack base address), memory monitor 128 can adjust the stack base address to be an address greater than the memory address referenced by the stack pointer. Where the stack pointer references a memory address that is less than the stack limit address (e.g., the stack pointer points to a location in memory with a lower address than the stack limit address), memory monitor 128 can adjust the stack limit address to be an address lower than the memory address referenced by the stack pointer. In other processor architectures where a stack grows towards higher memory addresses, memory address boundaries may be adjusted when the stack pointer references a memory address that is lower than the stack base address or greater than the stack limit address.

After memory monitor 128 adjusts the memory address boundaries of the currently executing application to include the memory address referred to by the stack pointer, exception handling procedures that verify whether the stack pointer refers to a valid memory address may indicate that the stack pointer does, in fact, refer to a valid memory address (e.g., points to a memory address within the memory address boundaries). The exception handler defined for a particular function may handle an exception without raising an unhandled exception that causes termination of the application and termination of malware component 126. For example, as discussed above, an exception may be raised when a malware component 126 attempts to transmit a request to a remote server but a domain name server (DNS) client service is disabled. After the exception is raised and memory monitor 128 adjusts the memory address boundaries of the currently executing application or thread, the operating system may compare the memory address referenced by the stack pointer to the stack base address and stack limit address. Upon determining that the memory address referenced by the stack pointer is within the adjusted memory address boundaries, error handling procedures defined for the transmission of data to a remote server may be processed. Because the raised exception may be handled successfully and may not cause termination of the application (and correspondingly, of the malware component), malware analysis application 122 may be able to record more of the activity generated by malware component 126 that it would if execution of the application and malware component 126 were terminated.

In some cases, memory monitor 128 may include an error handler to process and recover from errors encountered during execution of malware component 126 and/or other code executing within execution sandbox 124. The error handler may be invoked when memory monitor 128 detects that a memory address referenced by the stack pointer is outside of the memory address boundaries defined for the application or thread. The error handler included in memory monitor 128 may process errors generated during execution of an application without checking the memory address referenced by the stack pointer against the stack base address and stack limit address to determine whether the memory address referenced by the stack pointer is outside of the memory address range established for the application or thread.

Malware repository 130 generally provides a repository in which samples of malware components may be stored and downloaded onto a test device for observation. In some cases, malware repository 130 may store different variants of a malware component for analysis, which may allow a user of test device 120 to load a plurality of variants of the malware component for analysis to identify similarities and differences in the runtime behavior of the different variants.

Figure 2:
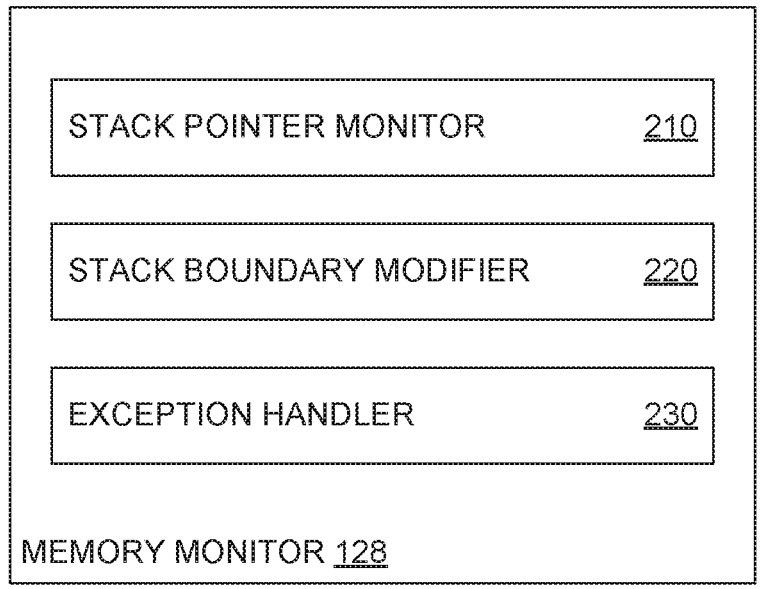
FIG. 2 illustrates an example memory monitor for a malware analysis system, according to one embodiment.

FIG. 2 illustrates an example memory monitor 128, according to an embodiment. As illustrated, memory monitor 128 generally includes a stack pointer monitor 210 and a stack boundary modifier 220.

Stack pointer monitor 210 is generally configured to monitor the current memory address referenced by the stack pointer and compare the current memory address to the memory addresses defined as the boundary addresses for the application currently executing on test device 120. As discussed above, in some cases, stack pointer monitor 210 may monitor (e.g., continuously, periodically, or in a situation based manner) the current memory address referenced by the stack pointer to determine whether the current memory address referenced by the stack pointer is within the boundary addresses defined for the application. In some cases, stack pointer monitor 210 may be invoked when an application enters an exception handling routine and before the exception handling routine checks the memory address referenced by the stack pointer against the memory address boundaries for the application.

If stack pointer monitor 210 determines that the memory address referenced by the stack pointer is within the boundary addresses defined for the application, memory monitor 128 need not take any further action (e.g., need not adjust one or more of the stack base address or the stack limit address to include the memory address referenced by the stack pointer). Otherwise, stack pointer monitor 210 determines that the memory address referenced by the stack pointer is outside the boundary addresses and may take one or more actions to allow for successful error handling when the memory address referenced by the stack pointer is outside the boundary addresses. In some cases, the one or more actions may include invoking stack boundary modifier 220 to adjust the memory address boundaries to include the memory address referenced by the stack pointer, as discussed above. In some cases, stack pointer monitor 210 may process an exception generated during execution of an application using exception handler 230, which, as discussed above, may omit boundary checks on the memory address referenced by the stack pointer while processing the exception.

Stack boundary modifier 220 generally uses the comparison of the memory address referenced by the stack pointer to the stack base and stack limit addresses to adjust the memory address range associated with an application. In some cases, stack boundary modifier 220 can receive, from stack pointer monitor 210, the memory address referenced by the stack pointer and an indication of whether the memory address referenced by the stack pointer is greater than a stack base address or less than a stack limit address. Based on the indication of whether the memory address referenced by the stack pointer is greater than a stack base address or less than a stack limit address, stack boundary modifier 220 can adjust the memory address range associated with an application to include the memory address referenced by the stack pointer (e.g., the memory address resulting from a stack pivot performed during execution of malware component 126).

In some cases, stack boundary modifier 220 can adjust the stack base address upwards to account for a stack pivot that sets the memory address referenced by the stack pointer to a memory address that is greater than the stack base address. Where a stack pivot results in the memory address referenced by the stack pointer being an address less than that of the stack limit address, stack boundary modifier 220 can adjust the stack limit address downwards to include the memory address referenced by the stack pointer.

In one example, stack boundary modifier 220 can receive an indication of a distance between the memory address referenced by the stack pointer and the stack base address or the distance between the memory address referenced by the stack pointer and the stack limit address. To adjust the memory address range associated with the application, stack boundary modifier can adjust the stack base address and/or stack limit address by the distance between the memory address referenced by the stack pointer and the stack base address and/or stack limit address, plus a buffer of an additional number of addresses. By adjusting the memory address range using a number of addresses greater than the number of addresses between the memory address referenced by the stack pointer and the stack base address and/or stack limit address, stack boundary modifier 220 can preemptively adjust the memory address range. Preemptively adjusting the memory address range may reduce a number of times that memory monitor 128 need adjust the memory address range during execution of malware component 126 in execution sandbox 124.

Exception handler 230 may be a custom exception handler that stack pointer monitor 210 can invoke if stack pointer monitor 210 determines that the memory address referenced by the stack pointer is outside of a memory address boundary established for an application or thread. When stack pointer monitor 210 invokes exception handler 230, exception handler 230 can process an exception without terminating the application if the stack pointer is outside the memory address boundaries. In some cases, exception handler 230 may be implemented without the use of assertions to compare the memory address referenced by the stack pointer to the stack base address and stack limit address established for the application or thread.

Figure 3:
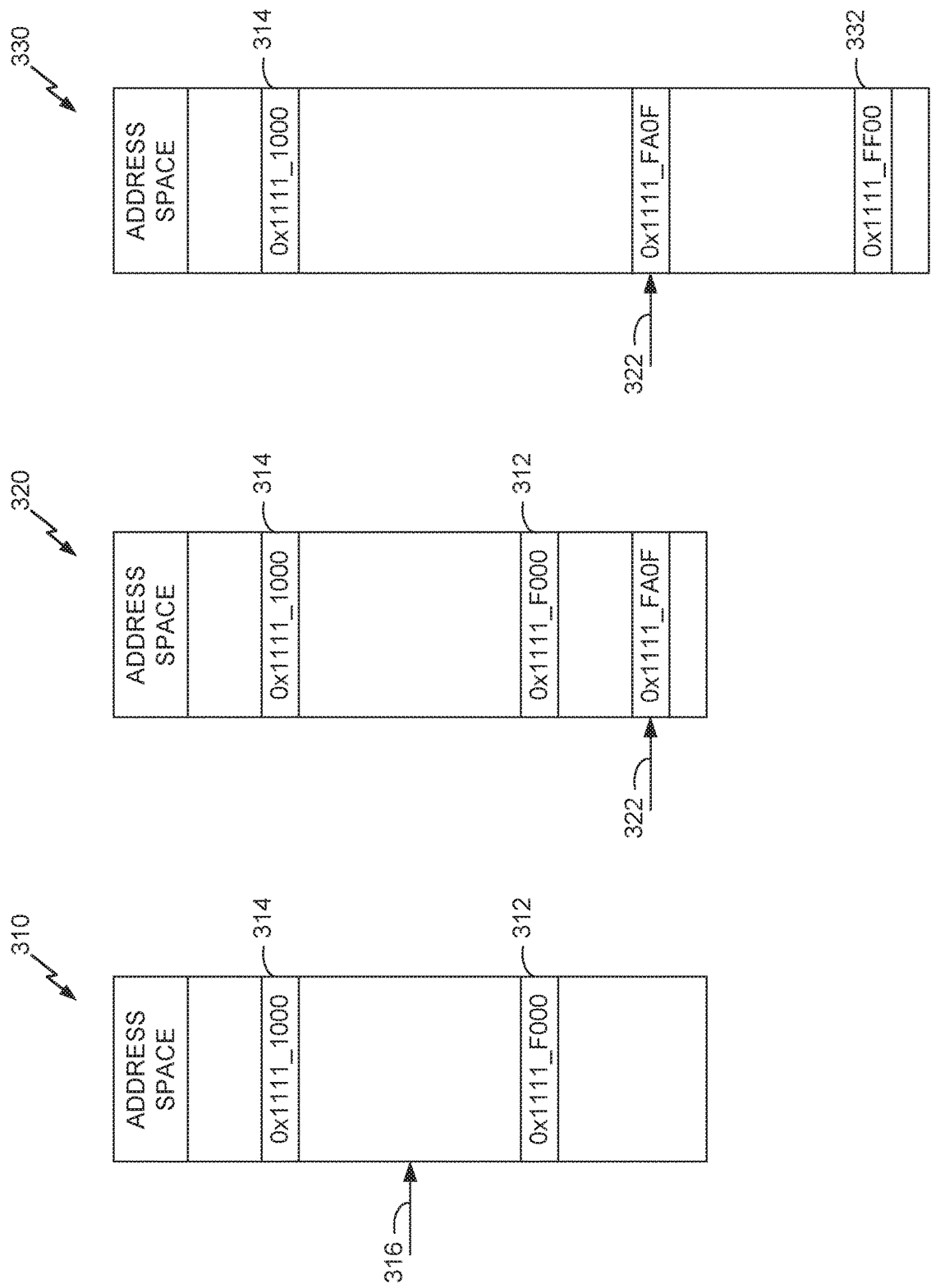
FIG. 3 illustrates example of memory stack modification to aid in execution of malware components, according to one embodiment.

FIG. 3 illustrates an example progression of stack pointers and memory address boundary adjustments, according to an embodiment. As illustrated, in an initial state 310, a stack base address 312 for an application may be defined as the memory address 0x1111_F000, and a stack limit address 314 may be defined as the memory address 0x1111_1000. The memory address range between 0x1111_1000 and 0x1111_F000 may be considered a valid address range for the application, and if exceptions are raised during execution of the application, a stack pointer 316 referencing an address within the memory address range of 0x1111_1000 and 0x1111_F000 may be handled correctly (e.g., may be handled without generating a subsequent unhandled exception that causes application termination.

State 320 illustrates the address space after a malware component or exploit code has performed a stack pivot, which, as discussed above, may result in a change in the memory address referenced by the stack pointer. As illustrated, stack pointer 322 may replace stack pointer 316 and reference a memory address outside of the memory address range defined by stack base address 312 and stack limit address 314. In this example, stack pointer 322 references memory address 0x1111_FA0F, which is a memory address that is greater than the stack base address 312. If the application raises an exception while in state 320, the operating system may determine that the stack pointer is invalid (e.g., references an address outside of the memory address range defined by stack base address 312 and stack limit address 314) and may terminate execution of the application.

To allow malware component 126 to continue to execute, memory monitor 128 may adjust the stack base address 312 and/or stack limit address 314, as discussed above. State 330 illustrates the address space after memory monitor 128 has adjusted the memory address range to include the memory address referenced by stack pointer 322. As illustrated, memory monitor 128 may generate a new stack base address 332. New stack base address 332 may be updated to include the memory address referenced by stack pointer 322 and may include additional addresses, which may reduce the number of times that memory monitor 128 need adjust the memory address range. As illustrated, at state 330, the new memory address range encompasses memory addresses between 0x1111_1000 (the previous stack limit address) and 0x1111_FF00 (the new stack base address).

Figure 4:
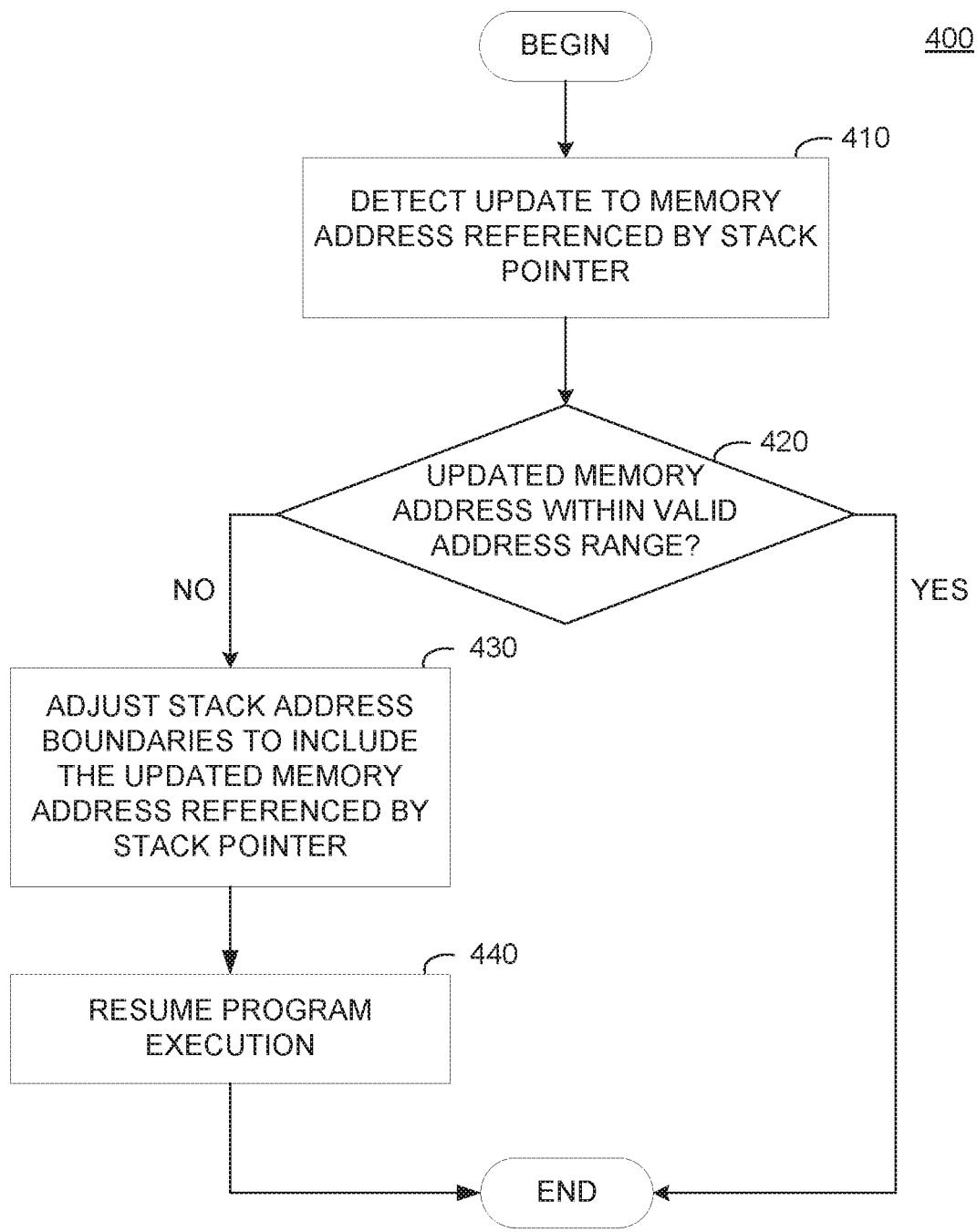
FIG. 4 illustrates example operations for adjusting program memory boundaries to aid in execution of malware components in a malware analysis system, according to one embodiment.

FIG. 4 illustrates example operations 400 for maintaining an execution safety container in which malware components may be executed and analyzed, according to an embodiment. As illustrated, operations 400 begin at step 410, where a memory monitor 128 detects an update to a memory address referred to by the stack pointer. As discussed above, memory monitor 128 may detect updates to memory address referred to by the stack pointer, for example, as those updates occur or when execution of an application and/or malware component causes an exception to be raised.

At step 420, memory monitor 128 determines whether the updated memory address is within a valid memory address range. As discussed above, a valid memory address range may be defined by the stack base address and the stack limit address, which respectively define the highest memory address and lowest memory address that a stack pointer can reference for a particular application. If the updated memory address is within the valid memory address range, memory monitor 128 may determine that no action need be taken to adjust the memory address range, and operations 400 may terminate.

Otherwise, memory monitor 128 may determine that the updated memory address referenced by the stack pointer is outside the valid memory address range (e.g., greater than the stack base address or less than the stack limit address). At step 430, memory monitor 128 adjusts the stack address boundaries to include the updated memory address referenced by the stack pointer. As discussed above, in some cases, memory monitor 128 may adjust the stack base address to an address higher than the updated memory address referenced by the stack pointer or adjust the stack limit address to an address lower than the updated memory address referenced by the stack pointer.

At step 440, memory monitor 128 causes the application to resume program execution. As discussed, in some cases, memory monitor 128 may adjust the stack address boundaries after an exception is raised by an application or malware component 126. After memory monitor 128 has adjusted the stack address boundaries to include the updated memory address referenced by the stack pointer, memory monitor 128 may pass control back to the application to allow the application to handle the exception.

Figure 5:
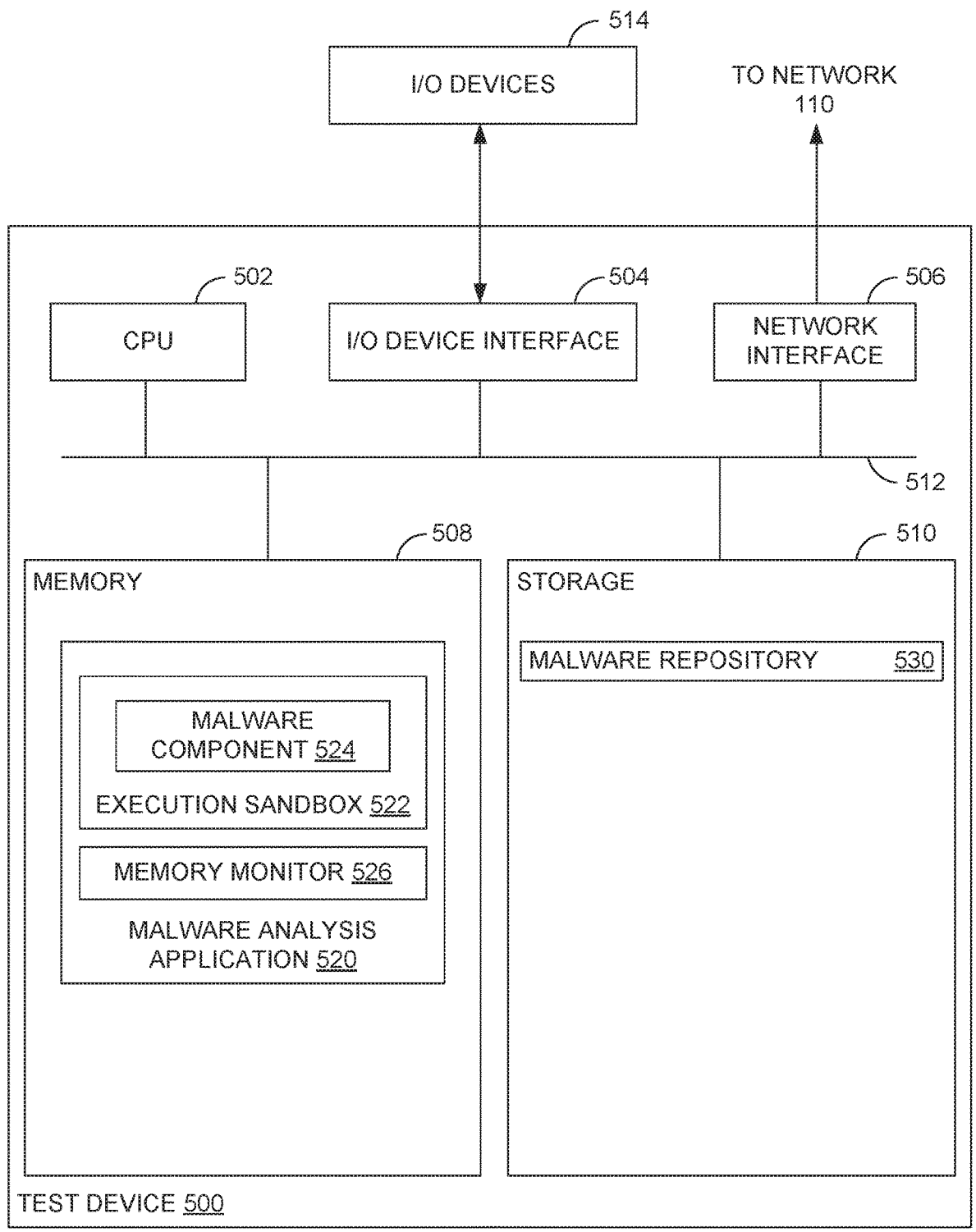
FIG. 5 illustrates an example computing system for managing memory boundaries during the performance of malware analysis, according to one embodiment.

FIG. 5 illustrates an example test device 500 that allows for the creation and use of execution safety containers in which malware components may be executed and analyzed, according to an embodiment. As shown, the test device 500 includes, without limitation, a central processing unit (CPU) 502, one or more I/O device interfaces 504 which may allow for the connection of various I/O devices 514 (e.g., keyboards, displays, mouse devices, pen input, etc.) to the test device 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into or connected to test device 500, such as keyboards, mice, touchscreens, and so on. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a malware analysis application 520. Malware analysis application 520, as discussed herein, generally provides an execution sandbox 522 in which a malware component 524 executes and a memory monitor 526. Execution sandbox 522 allows for the isolation of malware component 524 from other applications executing on test device 500 and data stored on test device 500. To analyze a malware component, a user of test device 500 can obtain a malware component from a repository (e.g., malware repository 530 in storage 510 or a remote malware repository) and load the malware component into execution sandbox 522 of malware analysis application 520.

During execution of malware component 524 in execution sandbox 522, exceptions may be generated, and exception handler procedures may be invoked to handle the generated exceptions. As discussed above, malware components that use stack modification techniques, such as stack pivoting, may edit the stack pointer to point to a location outside of the memory address boundaries defined for an application. To allow the program to continue executing without raising an unhandled exception (which, as discussed above, may cause the program to terminate), memory monitor 526 may monitor for changes to the memory address referenced by a stack pointer.

As discussed above, memory monitor 526 may monitor for changes to the memory address referenced by a stack pointer as changes occur or when an exception is thrown by an application or malware component 524 executing on test device 500. When memory monitor 526 detects a change, memory monitor 526 can compare the memory address referenced by the stack pointer to the lower and upper bounds of the memory addresses allocated to the application or malware component. In some cases, if memory monitor 526 determines that the memory address referenced by the stack pointer is outside of the memory address range (e.g., greater than the stack base address or less than the stack limit address), memory monitor 526 can adjust the memory address boundaries such that the memory address referenced by the stack pointer is within the range of addresses that are valid for the currently executing application or malware component. In some cases, memory monitor 526 may invoke an exception handling process provided by an exception handler within memory monitor 526. The exception handler within memory monitor 526 may process exceptions regardless of whether the memory address referenced by the stack pointer is within the memory address range defined for the application, thread, or malware component 524 executing on test device 500.

As shown, storage 510 includes a malware repository 530. Malware repository 530 generally provides a database in which different malware variants may be stored and accessed for analysis. As discussed, a user can load a malware component into the execution sandbox 522 of malware analysis application 520 to analyze the runtime behavior of the malware component. In some cases, malware repository 530 may be updated to reflect which malware variants have been tested and which have not. In some cases, malware repository 530 may be continually updated to reflect changes in a threat environment, such as new variants of existing malware components being released to the public, the emergence of new malware threats, and the like.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for testing applications having exploit computer code within execution safety containers, the method being performed by a computing device having at least one processor, the method comprising:
executing an application within an execution safety container on the computing device, the application having exploit computer code therein;
during execution of the application, monitoring a stack pointer of the computing device for changes in a memory address referenced by the stack pointer;
detecting that the memory address referenced by the stack pointer has changed from a first memory address to a second memory address;
determining that the second memory address is outside of a memory address range associated with the application in the execution safety container by determining that the second memory address is higher than an upper bound of the memory address range or the second memory address is lower than a lower bound of the memory address range; and
in response to determining that the second memory address is outside of the memory address range:
taking one or more actions to avoid occurrences of unhandled exceptions caused by the referenced memory address being outside of the memory address range associated with the application, and continuing execution of the application.

2. The method of claim 1, wherein the one or more actions comprise:
adjusting the memory address range to include the referenced memory address.

3. The method of claim 1, wherein the one or more actions comprise:
invoking an exception handler that does not check the referenced memory address against the memory address range associated with the application to process one or more exceptions generated during code execution.

4. The method of claim 1, wherein detecting that the memory address referenced by the stack pointer has changed from the first memory address to the second memory address is performed upon detecting that an exception has been thrown during application runtime.

5. The method of claim 1, wherein the memory address range comprises a range defined by a stack base address and a stack limit address.

6. The method of claim 5, wherein the one or more actions comprise adjusting the memory address range by:
determining that the referenced memory address is greater than the stack base address; and
setting the stack base address to a memory address greater than the referenced memory address.

7. The method of claim 5, wherein the one or more actions comprise adjusting the memory address range by:
determining that the referenced memory address is less than the stack limit address; and
setting the stack limit address to a memory address less than the referenced memory address.

8. The method of claim 1, wherein the one or more actions comprise adjusting the memory address range to include a number of addresses in excess of a difference between a boundary of the memory address range and the referenced memory address.

9. A system, comprising:
a processor; and
a memory storing instructions which, when executed by the processor, perform an operation for testing applications having exploit computer code within execution safety containers, the operation comprising:
executing an application within an execution safety container on a computing device, the application having exploit computer code therein;
during execution of the application, monitoring a stack pointer of the computing device for changes in a memory address referenced by the stack pointer;
detecting that the memory address referenced by the stack pointer has changed from a first memory address to a second memory address;
determining that the second memory address is outside of a memory address range associated with the application in the execution safety container by determining that the second memory address is higher than an upper bound of the memory address range or the second memory address is lower than a lower bound of the memory address range; and
in response to determining that the second memory address is outside of the memory address range:
taking one or more actions to avoid occurrences of unhandled exceptions caused by the referenced memory address being outside of the memory address range associated with the application, and continuing execution of the application.

10. The system of claim 9, wherein the one or more actions comprise:
adjusting the memory address range to include the referenced memory address.

11. The system of claim 9, wherein the one or more actions comprise:
invoking an exception handler that does not check the referenced memory address against the memory address range associated with the application to process one or more exceptions generated during code execution.

12. The system of claim 9, wherein detecting that the memory address referenced by the stack pointer has changed from the first memory address to the second memory address is performed upon detecting that an exception has been thrown during application runtime.

13. The system of claim 9, wherein the memory address range comprises a range defined by a stack base address and a stack limit address.

14. The system of claim 13, wherein the one or more actions comprise adjusting the memory address range by:
determining that the referenced memory address is greater than the stack base address; and
setting the stack base address to a memory address greater than the referenced memory address.

15. The system of claim 13, wherein the one or more actions comprise adjusting the memory address range by:
determining that the referenced memory address is less than the stack limit address; and
setting the stack limit address to a memory address less than the referenced memory address.

16. The system of claim 9, wherein the one or more actions comprise adjusting the memory address range to include a number of addresses in excess of a difference between a boundary of the memory address range and the referenced memory address.

17. A non-transitory computer-readable medium having instructions stored thereon which, when executed by one or more processors, perform an operation for testing applications having exploit computer code within execution safety containers, the operation comprising:
- executing an application within an execution safety container on a computing device, the application having exploit computer code therein;
- during execution of the application, monitoring a stack pointer of the computing device for changes in a memory address referenced by the stack pointer;
- detecting that the memory address referenced by the stack pointer has changed from a first memory address to a second memory address;
- determining that the second memory address is outside of a memory address range associated with the application in the execution safety container by determining that the second memory address is higher than an upper bound of the memory address range or the second memory address is lower than a lower bound of the memory address range; and
- in response to determining that the second memory address is outside of the memory address range:
  - taking one or more actions to avoid occurrences of unhandled exceptions caused by the referenced memory address being outside of the memory address range associated with the application, and continuing execution of the application.

18. The non-transitory computer-readable medium of claim 17, wherein detecting that the memory address referenced by the stack pointer has changed from the first memory address to the second memory address is performed upon detecting that an exception has been thrown during application runtime.

19. The non-transitory computer-readable medium of claim 17, wherein the one or more actions comprise:
- upon determining that the referenced memory address is not within the memory address range associated with the application, adjusting the memory address range to include the referenced memory address.

20. The non-transitory computer-readable medium of claim 17, wherein the one or more actions comprise:
- invoking an exception handler that does not check the referenced memory address against the memory address range associated with the application to process one or more exceptions generated during code execution.

* * * * *